Sept. 20, 1938.   M. I. SANDERSON   2,130,860
IMPLEMENT HITCH
Filed Nov. 13, 1936   2 Sheets-Sheet 1
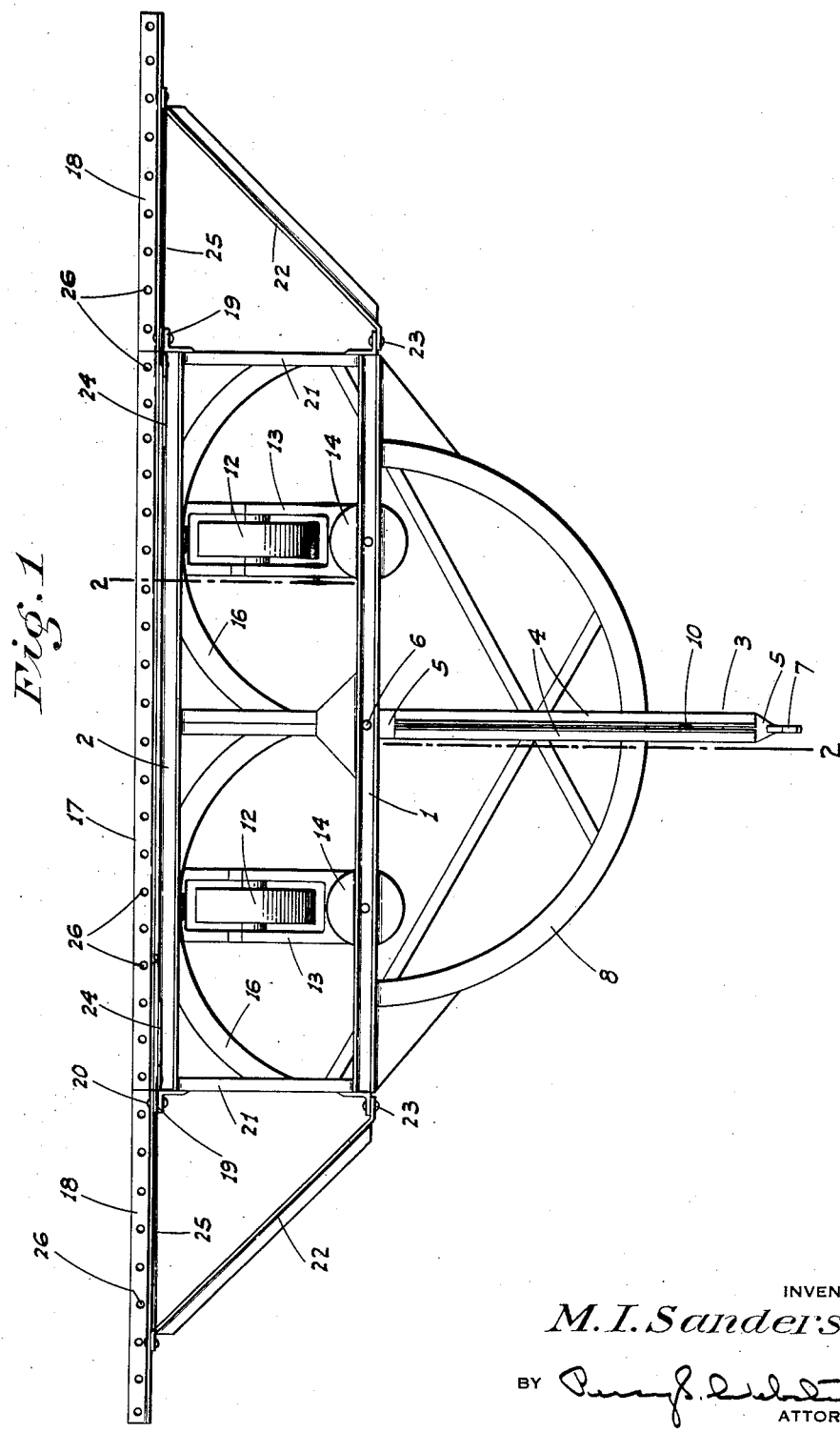

Sept. 20, 1938.　　　M. I. SANDERSON　　　2,130,860
IMPLEMENT HITCH
Filed Nov. 13, 1936　　　2 Sheets-Sheet 2
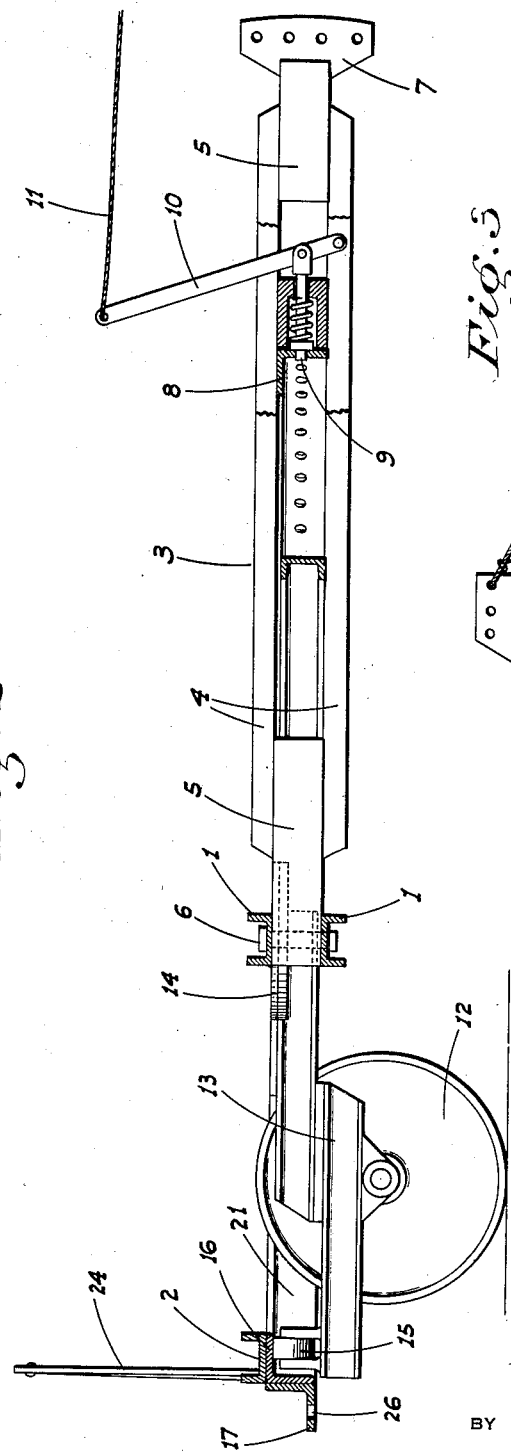
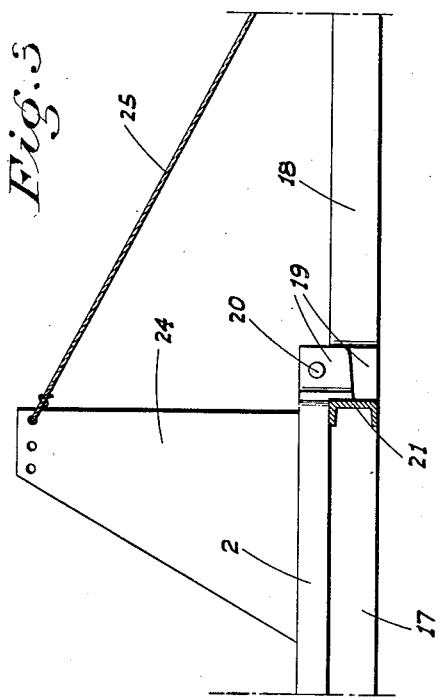
INVENTOR
M.I.Sanderson
BY
ATTORNEY Patented Sept. 20, 1938

2,130,860

UNITED STATES PATENT OFFICE 2,130,860

IMPLEMENT HITCH

Martin I. Sanderson, Davis, Calif., assignor of one-third to W. D. James, Sacramento, Calif., and one-third to F. P. Wray, Davis, Calif.

Application November 13, 1936, Serial No. 110,655

2 Claims. (Cl. 97—233)

This invention relates generally to an improved implement hitch and in particular relates to an improvement in that type of implement hitch known as "carts."

The principal object of my invention is to provide an implement hitch of the cart type, including swivelly mounted ground engaging wheels, and in which the tongue is selectively adjustable in a horizontal plane in order to alter the line of draft on the cart.

A further object of my invention is to provide a relatively wide implement mounting bar, the outer ends of which are separate and hinged for folding movement in a vertical plane from a normally extended position to one overlying the center portion of the bar. I also provide cable supporting means for the end sections of the implement mounting bar, said means being effective only when the end sections are extended and permitting of folding movement of said sections without restriction.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Fig. 1 is a top plan of the device with the end sections of the implement mounting bar in extended or normal position.

Fig. 2 is a sectional elevation of the device taken on line 2—2 of Fig. 1.

Fig. 3 is a fragmentary elevation of the hinge connection between an end section and the center section of the implement mounting bar, and the cable supporting means for said end section.

Referring now more particularly to the characters of reference on the drawings, the device comprises a frame substantially rectangular in plan and including transversely extending, vertically spaced front frame members 1 and a parallel rear frame member 2. A tongue indicated generally at 3, formed of vertically spaced beams 4 connected at their ends by spacing blocks 5, is pivoted at its inner end, as at 6, between the frame members 1 centrally of the ends thereof. Each beam 4 is preferably made up of spaced angle irons, as shown in Fig. 1. The forward end of the tongue is provided with a link 7 for connection to a tractor or the like.

A relatively large, semi-circular quadrant 8 is secured to and projects forward from the front frame members 1, said quadrant extending between the vertically spaced beams 4 of the tongue. The face of the quadrant is provided with a series of circumferentially spaced holes into one of which a spring pressed locking pin 9, mounted on the tongue, selectively engages, whereby to lock the tongue to the quadrant. A lever 10 is pivoted between the angle irons of the lower beam 4 and projects upward between the angle irons which form the upper beam 4. The lever is arranged in pivotal connection with the pin 9 to retract the same from engagement with the quadrant, a pull rope 11 being provided for control of the lever and locking pin from the tractor.

The cart frame is supported on a pair of transversely spaced wheels 12 swivelly mounted in the following manner. The wheels are journaled in horizontal yokes 13 which are swivelly secured at their forward ends between the frame members 1, a fifth wheel 14 being employed with each swivel connection in order to provide the necessary stability for the yokes and wheels. The rear end of each yoke is provided with a roller 15 which extends upward and rides on a horizontal, semi-circular track 16 mounted between the front and rear frame members concentric with the fifth wheel.

The cart is provided with a transverse implement mounting bar, formed of angle iron, and comprising a main center portion 17 rigidly secured to the rear frame members 2, and end sections 18 normally alined with the center section but hinged to the frame for upward folding movement in a vertical plane. The adjacent ends of the end sections and the center section are hinged together by means of hinge plates 19, pivoted together at 20, said adjacent ends abutting together, as at 21, when the end sections are alined with the center section, and prevent the end sections from moving below a horizontal plane. Braces 22 of angle iron are fixed at one end to the end sections adjacent their outer ends and extend forward and inward to pivotal connections 23 secured to the frame adjacent the front corners thereof. As the pivotal connections 23 are axially alined with the pivots 20, the braces 22 can swing upward with the end sections.

An upstanding plate 24 is mounted at each end of the rear frame member 2, a flexible supporting cable 25 extending from the top of each plate to the outer end of the adjacent end section 18. These cables prevent sagging of the outer ends of the end sections and relieve their hinges of strain. The plates are secured to the rear frame member 2 in such position that the end sections 18 may be folded over the center section 17 clear of said plates. The implement mounting bar is formed with a series of spaced holes 26 extending from end to end of the bar.

Operation

In use, my implement hitch or cart is attached to a tractor or the like by means of link 7 on the outer end of tongue 3. The ground working implements are attached to the implement bar, the end sections of the bar normally being extended. The tongue 3 is locked to quadrant 8 in any desired position by means of the locking pin 9, such position depending on the line of draft required.

The advantage of my improved implement hitch resides in the fact that not only may the line of draft be easily adjusted to any desired angle, but the swivel mounting of the wheels permits the cart to be turned at very sharp angles while remaining substantially horizontal and stable. The implement mounting bar does not tend to tip or cant. The swivel mounting of the wheels also permits the cart to be turned without dragging the wheels, the wheels automatically following the line of draft.

When it is desired to use only the center section of the implement mounting bar, or when the cart is being transported from place to place, the end sections are folded over the center section in the manner heretofore described.

Of course, to change the line of draft when the hitch is in use, the lever 10 is manipulated by pulling on cable 11 which withdraws pin 9 from engagement with quadrant 8. The tongue 3 then may be swung to the desired position and pin 9 again allowed to engage through one of the holes in the quadrant.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. In an implement hitch of the cart type comprising a frame, a forwardly projecting tongue pivoted on the frame for movement in a horizontal plane, means to lock the tongue against such pivotal movement and in selective positions, spaced caster type wheels pivoted on and supporting the frame, the pivots being disposed ahead of the center of the wheels and rearward of the tongue, and means to secure ground working implements in connection with the frame.

2. In an implement hitch of the cart type, a frame, spaced wheels mounted on and supporting the frame, a forwardly projecting tongue pivoted on the frame, said tongue including vertically spaced beams and means connecting said beams at intervals, a quadrant secured on the frame and extending forward between the vertically spaced beams of the tongue, said quadrant having a series of holes in one face thereof, a spring-advanced pin mounted on the tongue and normally engaging in one of said holes, and means mounted on the tongue to retract the pin to a position free of the quadrant; each of said tongue beams comprising transversely spaced members, and said last named means comprising a lever projecting upwardly between the members of the beams and pivoted at its lower end on the members of the lower beam, and a connection between said lever intermediate its ends and the forward end of the pin.

MARTIN I. SANDERSON.